(12) United States Patent
Liang

(10) Patent No.: US 8,402,764 B1
(45) Date of Patent: Mar. 26, 2013

(54) TRANSITION DUCT WITH SPIRAL COOLING CHANNELS

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 529 days.

(21) Appl. No.: 12/563,601

(22) Filed: Sep. 21, 2009

(51) Int. Cl.
 *F02C 1/00* (2006.01)
(52) U.S. Cl. ........................................... 60/755
(58) Field of Classification Search ............ 60/752–760; 431/158, 160, 353; 11/752–760
 See application file for complete search history.

(56) References Cited

U.S. PATENT DOCUMENTS

| | | | | |
|---|---|---|---|---|
| 2,617,255 | A * | 11/1952 | Niehus | 60/748 |
| 3,016,703 | A * | 1/1962 | Morris et al. | 60/752 |
| 3,398,527 | A * | 8/1968 | Taylor et al. | 60/752 |
| 3,706,203 | A * | 12/1972 | Goldberg et al. | 60/757 |
| 3,736,747 | A * | 6/1973 | Warren | 60/732 |
| 4,195,474 | A * | 4/1980 | Bintz et al. | 60/730 |
| 4,312,186 | A * | 1/1982 | Reider | 60/754 |
| 5,327,727 | A * | 7/1994 | Ward | 60/757 |
| 5,724,816 | A * | 3/1998 | Ritter et al. | 60/752 |
| 5,737,922 | A * | 4/1998 | Schoenman et al. | 60/752 |
| 5,833,450 | A * | 11/1998 | Wunning | 431/215 |
| 7,104,067 | B2 * | 9/2006 | Bunker | 60/752 |
| 7,373,778 | B2 * | 5/2008 | Bunker et al. | 60/752 |
| 7,603,843 | B2 * | 10/2009 | Froehlich | 60/257 |
| 2005/0044857 | A1 * | 3/2005 | Glezer et al. | 60/772 |

* cited by examiner

*Primary Examiner* — Phutthiwat Wongwian
(74) *Attorney, Agent, or Firm* — John Ryznic

(57) ABSTRACT

A transition duct for a gas turbine engine of the kind with can combustors, the transition duct is formed from an inner section and an outer section that form a cooling passage in-between. Each section includes spiral shaped ribs that form spiral shaped cooling channels in which the channels are angled so that a high degree of turbulence is produced within the cooling air flow.

8 Claims, 2 Drawing Sheets

TRANSITION DUCT WITH SPIRAL COOLING CHANNELS

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to an air cooled transition duct positioned between a combustor outlet and t turbine inlet.

2. Description of the Related Art Including Information Disclosed Under 37 CFR 1.97 and 1.98

A gas turbine engine includes a combustor that produces a hot gas flow and a turbine that receives the hot gas flow to produce mechanical work. The turbine includes a row of first stage stator vanes that receive the hot gas flow from the combustor and guide the flow into the first stage rotor blades. The highest temperature gas flow is found between the combustor outlet and the first stage rotor blades.

A combustor can be an annular combustor formed from two concentric walls or a plurality of can combustors arranged in an annular array around the engine. Annular combustors are typically used in aircraft engines. Can combustors are typically used in large industrial gas turbine engines. In both combustor types, a transition piece is needed to guide the hot gas flow from the combustor exit into the first stage guide vanes. In the annular combustor, the combustor exit is already annular in shape so not much redirecting is required. The exit flow from the annular combustor can flow directly into the first stage guide vanes.

In the can combustor arrangement, the hot gas flow from the combustor exit must be transformed from a circular flow to a segment of an annular flow. A transition duct in the IGT (industrial gas turbine) engine is circular in the inlet end and some-what rectangular in the outlet end so that the combined flow of all of the can combustors will be in an annular flow path at the inlet to the first stage stator vanes. The transition duct of the engine is exposed to the highest gas flow temperature. Thus, improved cooling of the transition duct will increase the part life.

BRIEF SUMMARY OF THE INVENTION

It is an object of the present invention to provide for a transition duct of a gas turbine engine with improved cooling capability that will reduce the metal temperature and therefore require less cooling air flow.

It is another object of the present invention to provide for a transition duct of a gas turbine engine with internal cooling air passages that do not require a ceramic core and investment casting process to form the transition duct cooling circuit.

It is another object of the present invention to provide for a transition duct of a gas turbine engine with an internal cooling air circuit that can modulate the cooling air flow and pressure with the transition duct.

It is another object of the present invention to provide for a transition duct of a gas turbine engine with an internal cooling air circuit that can be tailored to an internal surface heat load in order to achieve a desirable streamwise metal temperature.

It is another object of the present invention to provide for a transition duct of a gas turbine engine with an internal cooling air circuit that produces a higher internal heat transfer coefficient that prior art transition ducts.

The above objective and more are achieved with the transition duct for a gas turbine engine of the present invention, where the transition duct has a circular inlet end and an annular rectangular outlet end, and where the transition duct is formed from an inner wall section and an outer wall section that together form a cooling air passage in-between. The inner wall section is a thin wall section with an outer surface having an arrangement of spiral shaped ribs that form spiral shaped grooves for cooling air flow. The outer wall section includes an inner surface that also has spiral shaped ribs that form spiral shaped grooves for cooling air flow. The inner wall grooves form a flow path that flows in a clockwise direction while the spiral grooves on the outer wall section flow in a counter-clockwise direction so that the two sets of spiral grooves are counter flowing in order to produce a high amount of turbulence.

A radial spacing between the inner wall and the outer wall for the cooling air decreases in the direction of the hot gas flow in order to accelerate the cooling air flow through the transition duct in order to increase the channel flow internal heat transfer performance.

DETAILED DESCRIPTION OF THE INVENTION

The present invention is a transition duct for a gas turbine engine that uses a plurality of can combustors. One transition duct is used for each can combustor to guide the hot gas flow from the combustor outlet to the inlet of the first stage guide vanes.

Figure 1:
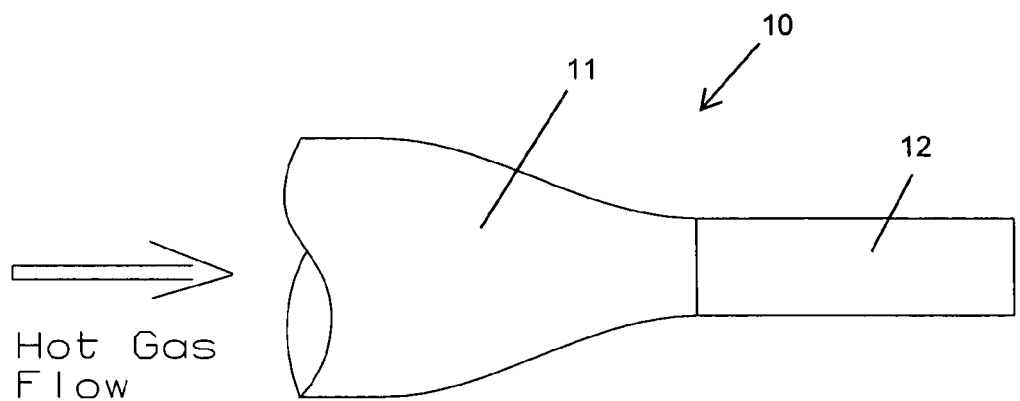
FIG. 1 shows a schematic view form the side of a transition duct of the present invention with a cone section and an intermediate exit piece.

FIG. 1 shows the transition duct 10 of the present invention with a cone section 11 on the inlet end and an intermediate exit piece (IEP) 12 on the outlet end. A hot gas flow passing into the cone section 11 and exits the IEP 12. A number of transition ducts are used in a gas turbine engine that uses can combustors. The inlet to the transition duct is circular to conform to the circular shaped exit of the can combustor. The outlet of the transition duct 10 is rectangular but with an annular curvatures in order to produce a total annular outlet for all of the transition ducts.

The cone section 11 of the transition duct 10 of the present invention is formed from two concentric pieces and includes an inner section 15 and an outer section or sleeve 16 that together form a cooling air passage between the two sections 15 and 16.

Figure 3:
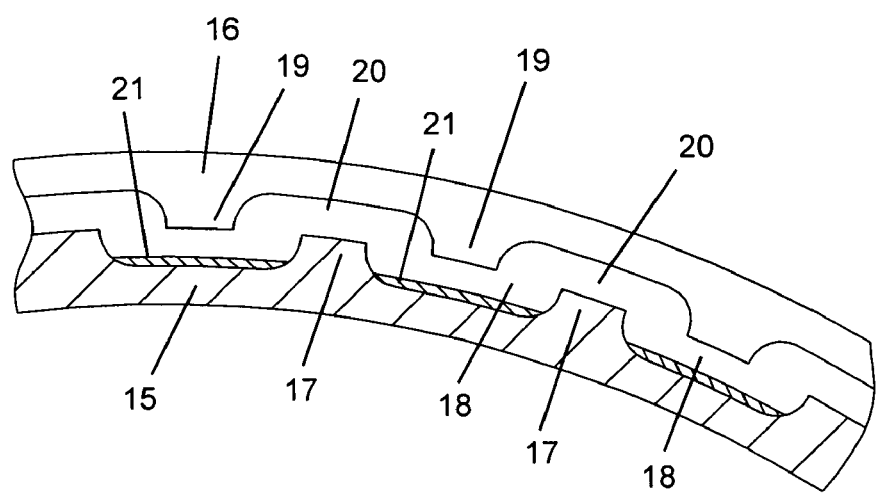
FIG. 3 shows a cross section front view of a section of the transition duct in the cone section.

FIG. 3 shows this arrangement. The inner section 15 includes an outer surface with a spiral arrangement of ribs 17 that form a spiral groove 18 for cooling air flow. The outer section 16 includes an inner surface with a spiral arrangement of ribs 19 that form a spiral groove 20 for cooling air flow. The grooves 18 on the inner section 15 spiral in an opposite direction to the spiral grooves 20 in the outer section 16. Trip strips 21 are formed on the surface of the spiral groove 18 on the inner section 15. The spiral grooves 18 on the inner section are deep enough so that a thin wall is formed between the bottom of the spiral groove 18 and the inner surface that is exposed to the hot gas flow in order to produce near wall cooling.

Figure 2:
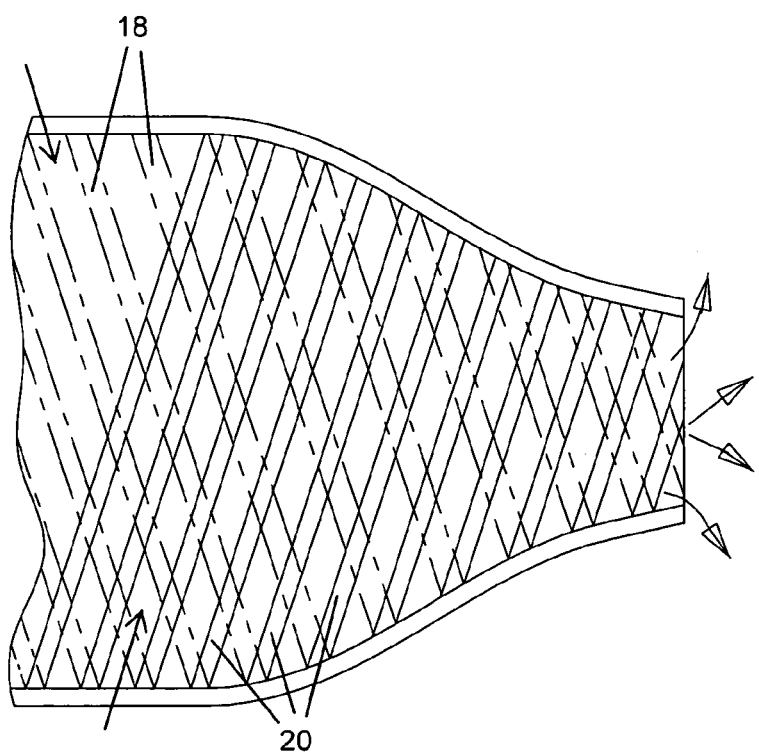
FIG. 2 shows a cross section view of the cooling air paths in the cone section of the transition duct of the present invention.

The hot gas flow is exposed to the inner surface of the inner section 15. The outer surface of the outer section 16 is the cool side. FIG. 2 shows the spiral channels 18 and 20 in relationship to each other. One spiral channel flows counterclockwise while the other spiral channel flows clockwise in order to produce counter flowing currents of cooling air within the passage formed between the two duct sections 15 and 16. The spiral ribs 17 and 19 are tall enough to form the spiral channels 18 and 20 but not too tall so that the inner section 15 can be slid into place within the outer section 16. The flat surfaces of the top so that the spiral grooves will form abutment or mateface surfaces when the two sections 15 and 16 are assembled in place.

Because of the two piece transition duct 10 with the separate inner section 15 and outer section 16, the spiral ribs in the sections can be formed by machining instead of investment casting which requires ceramic cores to form the passages for the cooling air. Investment casting requires ceramic cores that often break during the molding process and results in defect5ive cast parts which decreases the part yield.

In operation, cooling air is fed through the cooling manifold at the junction of burner basket and transition duct and then bleeds into the spiral flow channels 18 and 20 and finally exits out the transition duct through a row of metering holes. The cooling air from one spiral flow channel will be flowing at spiral formation created by the spiral ribs and interacted with the cooling air from the other spiral flow channel at the inner wall formed by the spiral rib on the opposite wall. The spiral cooling air flows react with each other and thus create a high degree of turbulence level. In addition the cooling air is accelerated through the two spiral flow channels as the radius of curvature of the cone section become tighter and the diameter gets smaller which thus increases the channel flow internal heat transfer performance from the flow channel entrance to exit section. At the entrance region of the spiral flow channel where the radius of curvature of the cone section is large and the cone external heat load is not as high as the exit plane section, the demand for the channel internal heat transfer coefficient is not as high as the exit section. As the cooling air approaches to the exit plane corner, the radius of curvature for the spiral flow channel becomes much smaller, the change of cooling air momentum becomes much rapidly thus augments the internal channel heat transfer coefficient to a much higher level prior discharging through the transition duct.

This continuous of flow phenomena with the exchange of momentum of two cooling flow streams and change of angular momentum effects created a counter flowing spiral flow channel cooling mechanism towards the exit plane of the transition cone section. The counter flowing spiral flow cooling process generates extremely a high turbulent level in the coolant flow and thus generates a high internal heat transfer coefficient. In conjunction with the high internal convective area and conduction path, created by the intricacy of the spiral cooling passages, a very high internal convective cooling effectiveness is achieved that is higher than the single pass straight flow channel used in the state-of-the-art transition cone cooling design.

With this unique cooling construction approach, a maximum usage of cooling air for a given transition duct heat load and pressure profile is achieved. In addition, the convergent spiral flow cooling mechanism yields a higher internal convection cooling effectiveness than the prior art parallel channel cooling technique used in the state-of-the-art transition duct cooling design.

Major design features and advantages of this cooling scheme over the conventional straight channel cooling designs are enumerated below. The convergent counter spiral flow channels modulate the cooling flow and pressure to the transition duct region. The milling machining of spiral flow channel eliminates the casting of parallel cooling mechanism thus minimizes fragile ceramic core and breakage of ceramic core thus enhances manufacturing yields. The two pieces transition cone construction technique allow the use milling machine of cooling channel on each half of the cone surface to form a counter flow channels at angle relative to each other. The convergent counter spiral flow channel cooling approach can be tailored to the external airfoil heat load to achieve desirable streamwise metal temperature distribution. The outer spiral flow channel can be milled onto the inner wall of the cooling duct at closer distance to the hot side wall thus create a near wall cooling technique and optimize the cooling performance. Cooling of the transition duct can be achieved with lower cooling flow rate. A simpler milling machining technique produces a lower cost transition duct with high cooling effective design when the outer cone assemble to the inner cone. High internal heat transfer coefficient is created at the turns and transition duct exit region where is needed for the transition duct exit region cooling. Acceleration of cooling flow within the convergent spiral flow channel creates higher rate of heat transfer for the transition duct exit region cooling. This is inline with the transition duct external heat load. Thus achieve a parallel heat load cooling concept. The counter spiral flow channel creates a continuous of exchange of two cooling air streams and angular momentum which is different than the straight flowing cooling channel design used today.

I claim the following:

1. A transition duct for a gas turbine engine to channel a hot gas flow from a combustor into a turbine, the transition duct comprising:
    a cone section and an intermediate exit piece, the cone section forming an inlet end for the transition duct and the intermediate exit piece forming an outlet end for the transition duct;
    the cone section having an outer section and an inner section that form a cooling air passage from an inlet to an outlet of the cone section;
    the inner section having an outer surface with a plurality of inner ribs that form cooling air channels, the inner ribs being at an angle to a longitudinal direction of the transition duct; and,
    the outer section having an inner surface with a plurality of outer ribs that form cooling air channels, the outer ribs being at an angle to a longitudinal direction of the transition duct such that the cooling air channels that form by the plurality of inner ribs counter flow to the cooling air channels that form by the plurality of outer ribs for the cooling air.

2. The transition duct of claim 1, and further comprising:
    the plurality of inner and outer ribs are spiral shaped ribs that form counter flowing spiral shaped channels for the cooling air.

3. The transition duct of claim 1, and further comprising:
    the plurality of inner and outer ribs both have flat top surfaces that form a mateface when the inner section is positioned within the outer section to form the cone section.

4. The transition duct of claim 1, and further comprising:
the cooling air channels on the inner section are deep enough to form a thin wall to produce near wall cooling of an inner surface of the inner section.

5. The transition duct of claim 1, and further comprising:
the cooling air channels on the inner section include trip strips to increase a heat transfer coefficient.

6. A transition duct for a gas turbine engine to channel a hot gas flow from a combustor into a turbine, the transition duct comprising:
an inner wall having an inner surface for exposure to a hot gas flow passing from a combustor into a turbine;
an outer wall having an inner surface and forming a cooling air passage with an outer surface of the inner wall;
the outer surface of the inner wall and the inner surface of the outer wall include a plurality of spiral shaped ribs that form cooling air channels; and,
wherein the cooling air channels that form by the plurality of spiral shaped ribs of the outer surface of the inner wall counter flow to the cooling air channels that form by the plurality of spiral shaped ribs of the inner surface of the outer wall.

7. The transition duct of claim 6, and further comprising:
the cooling air channels on the inner wall include trip strips to increase a heat transfer coefficient.

8. The transition duct of claim 6, and further comprising:
the plurality of inner and outer ribs both have flat top surfaces that form a mateface when the inner section is positioned within the outer section to form the cone section.

\* \* \* \* \*